United States Patent
Baumann

(10) Patent No.: US 8,101,902 B2
(45) Date of Patent: Jan. 24, 2012

(54) LIGHT GRID HAVING PHOTORECEIVERS AND PROGRAMMABLE LOGIC UNIT

(75) Inventor: Robert Baumann, Wangen (DE)

(73) Assignee: ifm electronic GmbH, Essen (DE)

( * ) Notice: Subject to any disclaimer, the term of this patent is extended or adjusted under 35 U.S.C. 154(b) by 450 days.

(21) Appl. No.: 12/372,843

(22) Filed: Feb. 18, 2009

(65) Prior Publication Data

US 2010/0006745 A1    Jan. 14, 2010

(51) Int. Cl.
*G06F 11/00* (2006.01)
*G01V 3/08* (2006.01)
(52) U.S. Cl. ......... 250/221; 702/188; 398/106; 324/329
(58) Field of Classification Search .................. 250/221; 324/329; 398/106; 702/188
See application file for complete search history.

(56) References Cited

U.S. PATENT DOCUMENTS

| | | |
|---|---|---|
| 5,130,532 A | 7/1992 | Clemens |
| 7,398,134 B2 * | 7/2008 | Carley et al. ................... 700/221 |
| 2006/0068696 A1 * | 3/2006 | Ashford et al. ............... 454/188 |

FOREIGN PATENT DOCUMENTS

| | | |
|---|---|---|
| DE | 3803033 A1 | 8/1989 |
| EP | 0397757 A1 | 11/1990 |
| WO | WO8907276 A1 | 8/1989 |

\* cited by examiner

*Primary Examiner* — Tony Ko
(74) *Attorney, Agent, or Firm* — MacMillan, Sobanski & Todd, LLC

(57) ABSTRACT

A light grid includes pairs of transmitters and receiver units, and a programmable logic unit for signal evaluation. The analog part of the light grid includes only the reception elements and the storage capacitors for performing analog-to-digital conversion.

17 Claims, 2 Drawing Sheets

LIGHT GRID HAVING PHOTORECEIVERS AND PROGRAMMABLE LOGIC UNIT

BACKGROUND OF THE INVENTION

1. Field of the Invention

This invention relates generally to producing and evaluating parallel digital signals representing a quantity of light received from incident light.

2. Description of the Prior Art

Light grids, also called light curtains, are used whenever the area to be monitored is too wide for a single light gate, or information is needed about the shape, size or position of an object penetrating the monitored area.

This can involve making a dangerous area safe, for instance by monitoring the pivoting range of a robot arm, or determining the actual position of an object, such as a fast-moving tool or machine part.

Light grids with many reception channels are complex and expensive. In the past, serial polling has found wide use. One such "light gate grid" is described in German Patent Disclosure DE32803033A1 (U.S. Pat. No. 5,130,532A). By way of a light source controller and a receiver controller, the light gates are activated in succession. The synchronization can be done, for instance, by way of a connecting line or via synchronization intervals of defined length. Since only one light gate at a time is ever active, mutual influence is practically precluded. By means of the serial evaluation, the digitization can be done by a single evaluation circuit, such as an analog to digital converter or a comparator. However, these advantages are offset by a relatively slow reaction time and only intermittent monitoring. A further disadvantage is that upon switchover of the channels, unwanted interference pulses can occur.

However, if chronologically virtually uninterrupted monitoring or a very fast reaction time is needed, then the only possibility is continuous operation of all the light gates in conjunction with parallel evaluation. In light grids that have 80 or more reception channels, this is quite complicated.

Lighting the area to be monitored with one or more direct-light sources therefore appears advantageous. The transmitter may for instance comprise a chain of light-emitting diodes (LEDs). In conjunction with digitizing the received signals with appropriate resolution, the presence of objects located close to the transmitter can still be demonstrated with certainty.

This necessitates considerable expense for circuitry, which can hardly be managed using discrete components or modules with a small scale of integration. It is not appropriate to use a microcontroller here, since conventional microcontrollers do not have enough ports for parallel processing of such a large number of reception channels. One conceivable solution would be to develop an application-specific integration circuit (ASIC) tailored especially for that task. In many cases, however, this cannot be considered for reasons of cost, because of the comparatively small numbers of items expected to be produced.

SUMMARY OF THE INVENTION

A system for parallel evaluation of a light grid produced by producing incident light includes receiver units, each unit producing a photoelectric current in response to the incident light received by the receiver unit; analog to digital converters, each converter producing in response to the current signal produced by each the receiver unit a digitized signal representing a quantity of light received by each receiver unit; and a processing unit for comparing at least one of the digital signals with a defined value stored in memory and for generating in response to the comparison a output signal representing a difference between the least one of the digital signals and the defined value.

A programmable logic unit may control the digital converter circuits.

The system is reliable and inexpensive for a light grid or a light curtain having a fast response time and high geometric resolution. To utilize the advantages of extremely fast parallel evaluation without the expense for circuitry as well as development actually necessary for this, particularly for operating an application-specific integrated circuit, it is proposed that the analog part be designed to be as small as possible and that a universally usable integrated circuit be employed.

The analog part of the reception channels comprises only the photoreceiver and a storage capacitor. All the other functions are taken on by a field programmable gate array (FPGA) or a complex programmable logic device (CPLD). This is advantageously done by making a separate analog to digital converter (sample C channel) available for each photoreceiver.

A specific logic configuration adapted to the particular monitoring task can thus be created, without the risk, which is justified for only very large numbers to be produced, of new development of an application-specific integrated circuit (ASIC). Another advantage is the great flexibility in further processing of the data once the analog to digital conversion has been done. Various customer wishes can be taken into account without changing the hardware, solely by means of a suitable configuration of the programmable logic unit (FPGA).

Since FPGAs and CLPDs have up to several hundred input and output channels, an equal number of receiver elements can be evaluated in parallel as well.

The resolution of the analog to digital converters can be selected flexibly. Since the clock speed of FPGAs and CLPDs can be as high as 100 MHz, a chronological resolution of 100 ns is attainable. For instance, a clock speed of 50 MHz with 100 ns resolution still means oversampling by a factor of 5.

As can be seen from the first exemplary embodiment, the measured values are immediately available with the desired resolution, namely with the adjustable bit width of the timer, so that further processing can be accomplished extremely fast. Thus the processing is not bound to a predetermined bit width as with the microcontroller.

Since only a few external components are needed, a compact construction is possible. The expense per measurement channel drops with an increasing number of channels, until the limit of capacity of the FPGA or CLPD is reached.

The scope of applicability of the preferred embodiment will become apparent from the following detailed description, claims and drawings.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
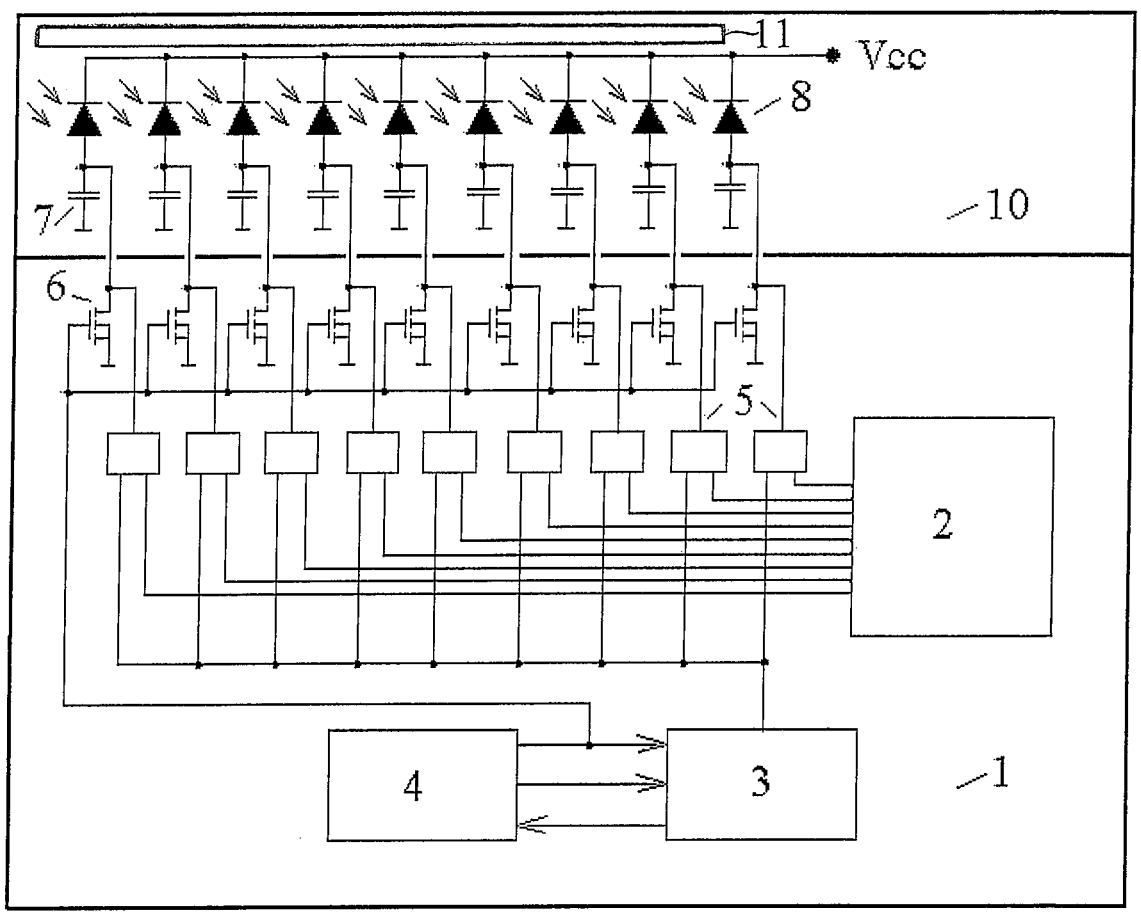
FIG. 1 is a schematic diagram showing a digitizing system including either a field programmable gate array (FPGA) or a complex programmable logic device (CPLD)

Referring now to the drawings, there is illustrated in FIG. 1 an embodiment that includes either a field programmable gate array (FPGA) or a complex programmable logic device (CPLD) 1, for instance a derivative from the "Spartan-3E" series, with 190 I/O ports and 500,000 system gates, made by Xilinx, that is configured in such a way that it essentially comprises one processing unit 2, one timer 3, one controller 4, capture units 5, and discharge transistors 6. The discharge transistors 6 are a component part of the I/O ports, where they actually serve as output transistors. The inputs of the I/O ports are a component part of the capture units 5, where they act as comparators, which generate a logical 1, if a defined input voltage is exceeded.

The analog part 10 comprises photodiodes 8 and storage capacitors 7. The photodiodes 8 operated in the reverse direction are the receiver units of the light grid. They convert the incident light from transmitters 11 into photoelectric currents. In their property as current sources, they are simultaneously an essential component of an analog to digital converter that operates by the single-slope method. The other components of the analog to digital converter are the storage capacitors 7, the discharge transistors 6, the capture units 5, the controller 4, and the timer 3.

The analog to digital conversion is done by the known single-slope method. To that end, the storage capacitors 7, charged by the photoelectric currents, are discharged cyclically via the discharge transistors 6.

This process is tripped by the controller 4, which at time T0 forces the tripping of the discharge transistors 6. Once a defined discharge time T1 has elapsed, the discharge transistors 6 block, and the timer 3 is started. The photoelectric currents then begin to charge the storage capacitors 7 again.

Once the voltage at one of the capacitors 7, and thus also at the input to the associated capture unit 5, reaches the threshold voltage VH, the actual timer value Tmess, made available to the timer 3 via a 10-bit-wide bus, is stored in memory in the capture units 5. Once the final timer value T2 is reached, the timer overflow generates a trigger signal, whereupon the capture units 5 that have not yet been triggered take on the final timer value.

Next, the controller 4 causes the measured values to be taken over into the memory of the processing unit 2. After that, all the capacitors 7 are discharged again by the discharge transistors 6, and the process begins over again. The timer values furnished by the capture units 5 are reciprocal to the quantities of light collected by the photodiodes and thus represent the digitized measured value (photoelectric current) of the respective receiver unit.

In the freely programmable processing unit 2, the measured values from the individual receiver units (reception channels) are compared with the previous measured values but also with comparison values that have been learned or long-term average values.

In some cases, dynamic threshold tracking is advantageous. In dynamic threshold tracking, the measured values are compared with the previous measured values, and new thresholds are defined as applicable.

If information about the actual transmission power is available, in the form of control or reference measured values, then the comparison can be made with such values as well.

Transmitter 11 may be a pulsed light source. In that case, measurement is done both during the pulse and in the pause between transmissions. The values measured in the pause between transmissions can be subtracted, as extraneous or interfering light, from the measured values. The advantage of the FPGA 1 is that various measurement and monitoring tasks can be performed using the same hardware. All that is necessary is suitable programming of the sequences in the processing unit 2.

A further advantage of this arrangement is that the photodiodes can be used not only as light receivers but all as current sources for the single-slope analog to digital conversion. As a result, the current-to-voltage conversion can be dispensed with, and the analog part 10 and hence the hardware of the light grid as well can be reduced to a minimum.

If very stringent demands are made in terms of measurement precision, the tolerance and temperature drift of the FPGA inputs may be overly great. In that case, a comparator is needed between the photodiodes and the FPGA input, as shown in FIG. 2.

Figure 2:
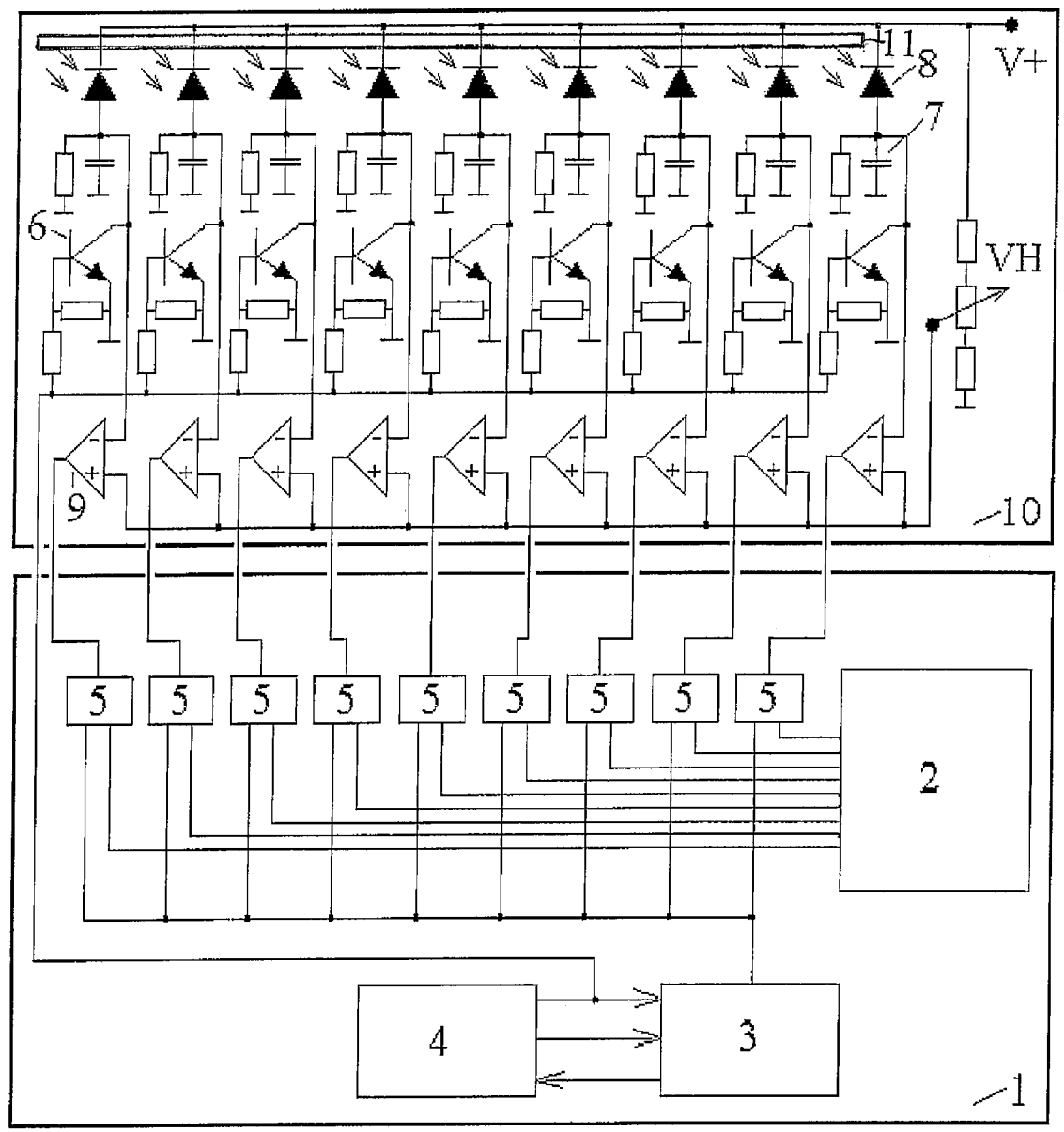
FIG. 2 is a schematic diagram similar to that of FIG. 1, but including a comparator located between the photodiodes and the FPGA input.

Referring now to FIG. 2, the ports of the field programmable gate array (FPGA) are used only as inputs. For that reason, the output transistors of the I/O ports, identified in FIG. 1 by reference numeral 6 and used as discharge transistors, are not shown. Their function in the embodiment of FIG. 2 is provided by the bipolar transistors, identified by reference numeral 6', in the analog part 10.

The sequence of the measurement is as described with reference to FIG. 1. The threshold voltage is applied to the non-inverting inputs of the comparators 9. This voltage can be furnished via a potentiometer, as shown in FIG. 2, or by the FPGA 1. If the voltage at the storage capacitors 7 reaches the threshold voltage VH, then the comparators 9 switch, and the capture units 5 store the actual timer values, which, as already described above, are taken on by the processing unit 2, in memory. With regard to the sequence of the analog to digital conversion, see the description of FIG. 1.

| | List of Reference Numerals |
|---|---|
| 1 | Field programmable gate array (FPGA) |
| 2 | Processing unit |
| 3 | Timer |
| 4 | Controller |
| 5 | Capture unit |
| 6 | Discharge transistor (N-MOS or NPN) |
| 7 | Storage capacitor (sample-C) |
| 8 | Photodiode |
| 9 | Comparator |
| 10 | Analog part |
| 11 | Transmitter producing incident light |

In accordance with the provisions of the patent statutes, the preferred embodiment has been described. However, it should be noted that the alternate embodiments can be practiced otherwise than as specifically illustrated and described.

What is claimed is:

1. A system for parallel evaluation of a light grid, comprising:
   a transmitter producing incident light;
   receiver units, each receiver unit producing concurrently with each of the other receiver units a photoelectric current in response to the incident light received by the receiver unit;
   analog to digital converters, each converter producing currently in response to the current signal produced by each receiver unit a digital value representing a quantity of light received by the corresponding receiver unit;
   a processing unit for comparing in parallel concurrently the digital values with a defined value stored in memory, and for generating in response to the comparison output representing a difference between each of the digital values and the defined value; and a programmable logic unit configured to store the digital values in the memory and to control a period during which the digitized values are produced.

2. The system as defined by claim 1, wherein the programmable logic unit is further configured to adjust a threshold voltage to which at least one of the digital values is compared.

3. The system as defined by claim 2, wherein the programmable logic unit comprises a field programmable gate array (FPGA).

4. The system as defined by claim 2, wherein the programmable logic unit comprises a complex programmable logic device (CPLD).

5. The system as defined by claim 1, further comprising storage capacitors, and an analog part wherein each the receiver unit is a photodiode.

6. The system as defined by claim 1, wherein the programmable logic unit comprises a field programmable gate array (FPGA).

7. The system as defined by claim 1, wherein the programmable logic unit comprises a complex programmable logic device (CPLD).

8. The system as defined by claim 1, wherein the transmitter transmits constant incident light.

9. The system as defined by claim 1, wherein the incident light produced by the transmitter originates at a single light source.

10. The system of claim 1 further comprising at least nine receiver units.

11. The system as defined by claim 1, wherein an analog part of the receiver units comprises a photo diode and a storage capacitor.

12. The system as defined by claim 1, wherein an analog part of the receiver units comprises:

photo diodes, each photo diode producing concurrently with each of the other photo diodes a photoelectric current in response to the incident light received from the transmitter; and storage capacitors, each storage capacitor charged by a photoelectric current produced by one of the photo diodes.

13. A method for operating a light grid, comprising the steps of:

(a) producing incident light;

(b) providing receiver units, each receiver unit producing currently with the other receiver units a photoelectric current in response to the incident light received by each receiver unit;

(c) producing in response to each of the currents a digital value representing a quantity of light received by each of the receiver units;

(d) comparing in parallel concurrently the digital values with a defined value;

(e) generating in response to the comparison output representing a difference between the digital values and the defined value.

14. The method of claim 13, wherein step (a) further comprises concurrently lighting each receiver unit.

15. The method of claim 13, wherein step (c) is performed by a single-slope method.

16. The method of claim 13, further comprising the steps of:

charging concurrently storage capacitors with said photoelectric current; and discharging the storage capacitors concurrently.

17. A system for parallel evaluation of a light grid, comprising:

a transmitter producing incident light;

photo diodes, each photo diode producing concurrently with each of the other photo diodes a photoelectric current in response to the incident light received from the transmitter;

storage capacitors, each storage capacitor charged by a photoelectric current produced by one of the photo diodes;

a timer that produces a count representing a period length;

capture units, each capture unit connected electrically to a corresponding storage capacitor, recording a digitized timer count when voltage at the corresponding storage capacitor reaches a reference voltage, said digitized timer count representing a quantity of light received by the corresponding photo diode;

transistors, each transistor discharging a corresponding storage capacitor;

a processing unit for comparing in parallel concurrently in real time the digitized timer count with a defined reference, and for generating in response to the comparison an output representing a difference between each of the digitalized time counts and the defined reference; and a programmable logic unit configured to use the digitalized timer counts to evaluate the quantity of light received by each photo diode.

* * * * *